US00RE37168E

(19) United States
(12) Reissued Patent
St. Louis

(10) Patent Number: US RE37,168 E
(45) Date of Reissued Patent: May 8, 2001

(54) ELECTRONIC CANDLE SIMULATOR

(76) Inventor: Raymond F. St. Louis, 90 Deckerton Turnpike, Montague, NJ (US) 07827

(21) Appl. No.: 09/241,260

(22) Filed: Feb. 1, 1999

Related U.S. Patent Documents

Reissue of:
(64) Patent No.: 5,600,209
Issued: Feb. 4, 1997
Appl. No.: 08/576,820
Filed: Dec. 21, 1995

U.S. Applications:
(63) Continuation of application No. 08/271,171, filed on Jul. 7, 1994, now abandoned.

(51) Int. Cl.[7] ..... H05B 41/44; H05B 41/36

(52) U.S. Cl. ..... 315/200 A; 315/199; 315/291; 315/76; 315/246; 315/209 R; 362/810; 362/161

(58) Field of Search ..... 315/194, 200 A, 315/76, 199, 209 R, 238, 291, 246, 360, 287, 293; 362/810, 161

(56) References Cited

U.S. PATENT DOCUMENTS

| | | | | |
|---|---|---|---|---|
| 1,584,856 | * | 5/1926 | Hauck . | |
| 2,972,706 | * | 2/1961 | Malm et al. | 315/200 A |
| 3,368,107 | * | 2/1968 | Skirvin | 315/209 |
| 3,435,286 | * | 3/1969 | Kayatt | 315/47 |
| 3,479,561 | * | 11/1969 | Janning | 315/119 |
| 3,500,126 | * | 3/1970 | Ford | 362/810 X |
| 4,159,442 | * | 6/1979 | Komatsu | 315/156 |
| 4,238,709 | * | 12/1980 | Wallace | 315/291 |
| 4,492,896 | * | 1/1985 | Jullien | 315/153 |
| 4,510,556 | * | 4/1985 | Johnson | 362/184 |
| 4,617,614 | * | 10/1986 | Lederer | 362/212 |
| 4,839,780 | * | 6/1989 | Chuan et al. | 362/265 |
| 5,097,180 | * | 3/1992 | Ignon et al. | 362/810 |

* cited by examiner

*Primary Examiner*—Arnold Kinkead
(74) *Attorney, Agent, or Firm*—Donald N. Timbie

(57) ABSTRACT

Apparatus for simulating a candle flame in which the current through the filament of a bulb is varied from a first value to a second value and back to the first value during spaced periods that vary from a period of maximum duration to a period of minimum duration that produces no observable flicker in an apparently random manner.

19 Claims, 4 Drawing Sheets

ELECTRONIC CANDLE SIMULATOR

Matter enclosed in heavy brackets [ ] appears in the original patent but forms no part of this reissue specification; matter printed in italics indicates the additions made by reissue.

This application is a continuation of application Ser. No. 08/271,171, filed Jul. 7, 1994, now abandoned.

BACKGROUND OF THE INVENTION

There are a number of situations where a candle is impracticable or too expensive. It would, for example, be impractical to use a candle for votive purposes in a cemetery, and in some places fire safety regulations would prevent it. Although candles are often used at dining tables in a restaurant, they are very expensive.

BRIEF SUMMARY OF THE INVENTION

Therefore, in accordance with this invention, an electrical candle is provided that simulates the flickering flame of an actual candle. An electrical circuit generates a control signal for varying the brightness of light emitted by a light emitting means between a first level and a second level and back to the first level during spaced periods of gradually increasing duration followed by periods of gradually decreasing duration, there being a number of periods of such short duration as to cause no noticeable change in brightness. In accordance with an aspect of this invention a suitable control signal may be derived by means including a first oscillator for producing waves at a given frequency, means including a second oscillator for producing waves at a slightly different frequency and means for increasing or decreasing the brightness of the light during times when the output waves of the first and second oscillators have like or unlike polarities respectively. The waves produced by the oscillators can be of any shape including sinusoidal or rectangular.

In accordance with this invention there are preferred operating parameters that the variations in brightness should meet in order to most effectively simulate the flame of a candle.

The change in brightness from a first level to a second and back to the first so as to produce a flicker during successive periods should occur at a rate between two and ten Hz with rates between four and one-half Hz and six Hz inclusive being preferred. When the first level is lower than the second, the flicker is an increase in brightness during the spaced periods, herein referred to as a positive flicker. This is preferred to the first level being higher than the second so as to produce a reduction in brightness during the spaced periods, herein referred to as a negative flicker. Furthermore, it is preferable that there be a ten to twenty percent change in brightness between the levels so that the light is not turned on and off because this tends to produce blinking rather than flickering. A blinking effect is also avoided by making the changes in brightness occur in a random manner or in a sequence that appears to be random.

It is important that the durations of the periods vary from one having the longest duration to one having minimum or no duration in a time between seven and thirty seconds, with fifteen seconds being preferred. The closer the frequencies of the two oscillators the longer it takes to go from a period of maximum duration to one of minimum duration, and the best simulation occurs when there is at least one period in each sequence during which there is no apparent flicker.

An electronically simulated candle of this invention can be energized by a battery so as to be easily moved about or it can obtain its energy by being plugged into an A.C. power outlet.

In accordance with another aspect of the invention, it is preferable that the light emitting means be an incandescent bulb that has the generally conical shape of a candle flame. A bulb that provides excellent simulation is about one and one half inches in height so as to approximate the height of a candle flame and has blue at its base and black lines extending part way up from the base so as to simulate a wick. For best results, the bulb should be translucent. If a bulb of clear glass is used, the simulation is improved by placing a translucent enclosure over the bulb that is preferably shaped like a candle flame and has the dark or blue base and the black lines simulating a wick.

BRIEF DESCRIPTION OF THE DRAWINGS

In the drawings corresponding components are designated in the same way.

DETAILED DESCRIPTION OF THE INVENTION

Figure 1:
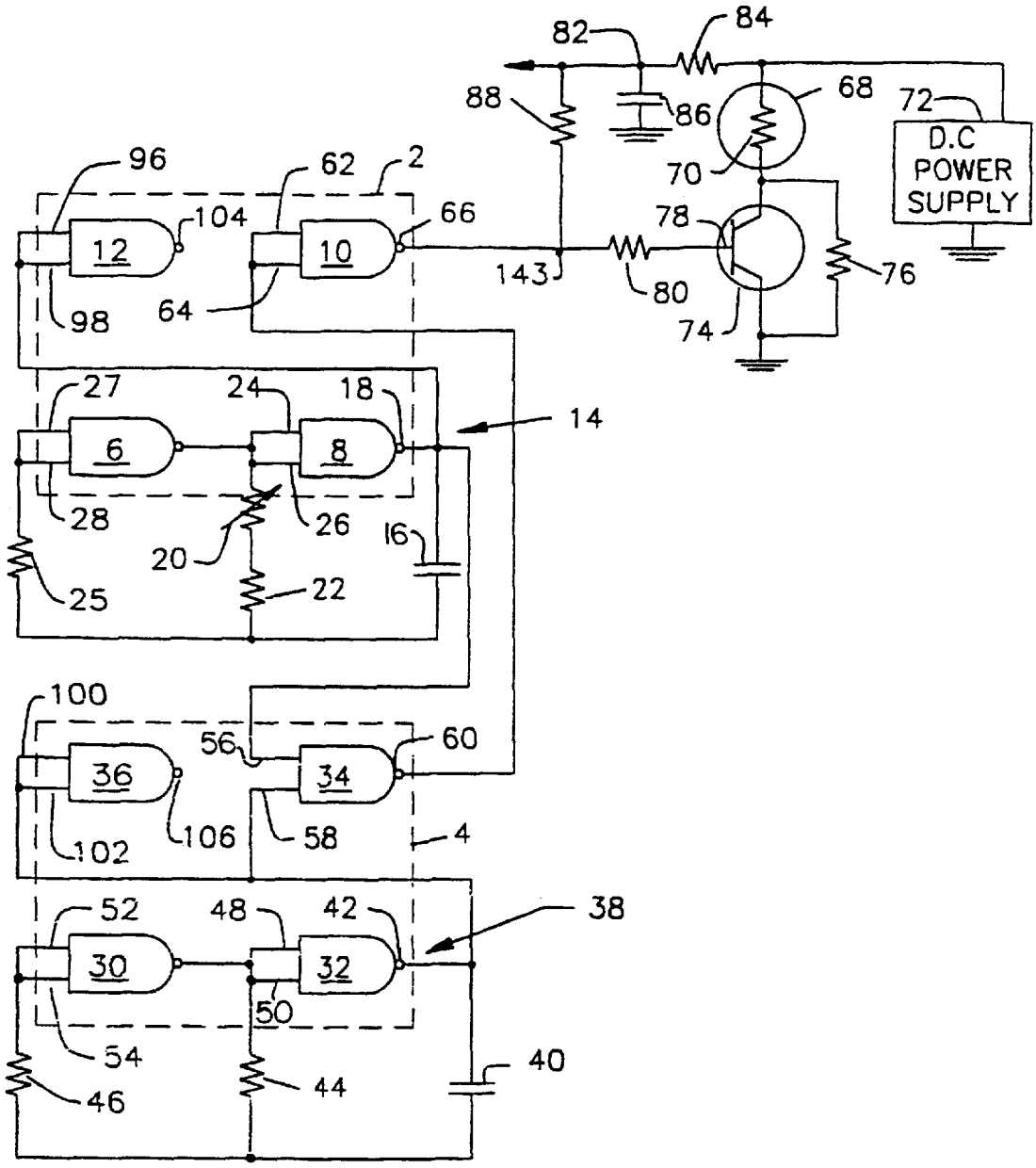
FIG. 1 is a schematic diagram of a preferred circuit for deriving a control signal of this invention.

Reference is made to the schematic diagram of FIG. 1, which shows a circuit comprised of two chips 2 and 4 in rectangles formed by dashed lines that, for example, may be 4011's. The chip 2 is comprised of four NAND gates 6, 8, 10 and 12. The NAND gates 6 and 8 are coupled so as to form a first multivibrator oscillator 14 that outputs square waves such as those illustrated in FIG. 1A, for example. In the particular embodiment shown, the coupling is comprised of a capacitor 16 having one side connected to the output 18 of the NAND gate 8, a variable resistor 20 and a resistor 22 connected in series between the other side of the capacitor 16 and the inputs 24 and 26 of the NAND gate 8 and a resistor 25 connected between the other side of the capacitor 16 and inputs 27 and 28 of the NAND gate 6.

Figures 1A, 1B, 1C:
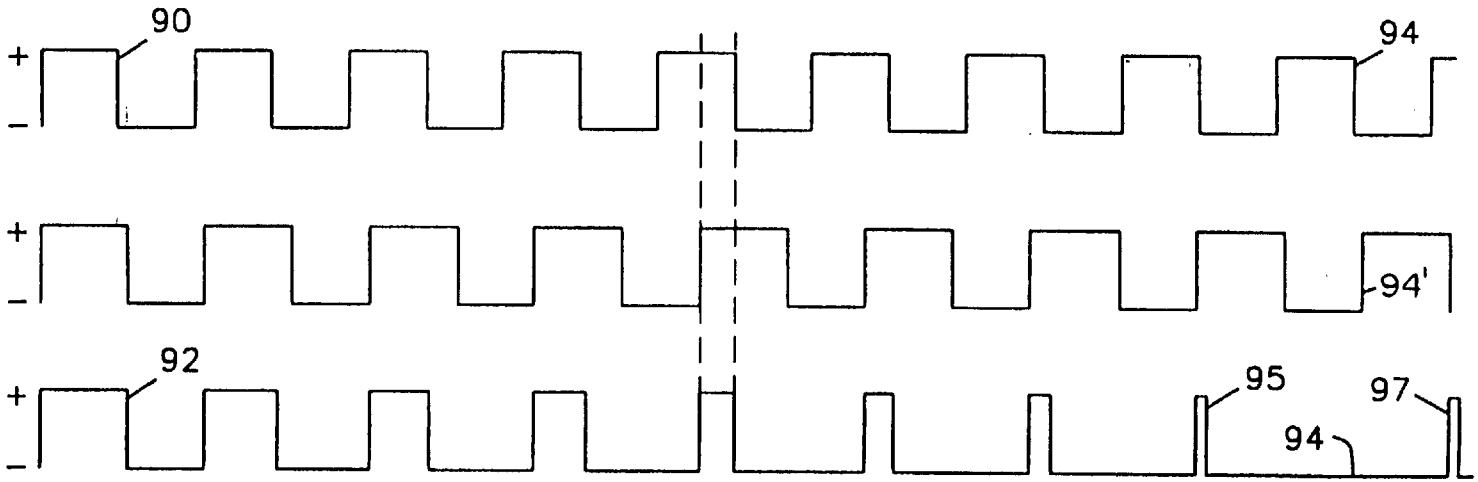
FIGS. 1A, 1B and 1C are waveforms used in explaining how the embodiments of FIGS. 1 and 2 generate a control signal.

The chip 4 is comprised of four NAND gates 30, 32, 34 and 36 the NAND gates 30 and 32 are coupled so as to form a second multivibrator oscillator 38 that outputs the square waves such as those illustrated in FIG. 1B, for example, that have a slightly lower frequency than those of FIG. 1A. In the particular embodiment shown, the coupling is comprised of a capacitor 40 having one side connected to the output 42 of the NAND gate 32 and resistors 44 and 46 that are respectively connected between the other side of the capacitor 40 and the inputs 48 and 50 of the NAND gate 32 and the inputs 52 and 54 of the NAND gate 30.

The output 18 of the NAND gate 8 where the square waves of FIG. 1A that are produced by the first multivibrator 14 appear, and the output 42 of the NAND gate 32 where the square waves of FIG. 1B that are produced by the second multivibrator 38 appear are connected to respective inputs 56 and 58 of the NAND gate 34, and its output 60 is connected to both inputs 62 and 64 of the NAND gate 10 to effectively make an AND gate of the combination of the NAND gate 34 and NAND gate 10 and produce a control signal such as illustrated in FIG. 1C at its output 66. Notice that, as in an AND gate, the control signal of FIG. 1C is high only when both the square waves of FIGS. 1A and 1B are high.

The light emitting means is herein indicated as being an incandescent bulb 68 having a filament 70. A means for controlling the brightness of the light emitted from the bulb 68 in accordance with the control signal of FIG. 1C that appears at the output 66 of the NAND gate 10 is now described. A power supply 72 that derives D.C. voltage from an A.C. source, not shown, is connected in series with the filament 70 and the collector/emitter path of a transistor 74, and a resistor 76 is connected in parallel with the collector/emitter path. The control signal at the output 66 of the NAND gate 10 is coupled to the base electrode 78 of the transistor 74 via a current limiting resistor 80 in order to protect the transistor 74. When the transistor 74 is not conducting, the current through the filament is less than maximum by an amount determined by the value of the resistor [16] *76* so that the brightness of the light is at a level less than maximum, but when the transistor 74 is conducting, it shorts the resistor 76 so as to permit maximum current to flow through the filament 70 and increase the brightness of the light from the bulb 68 to a maximum level.

Power is supplied to the IC's 2 and 4 from a junction 82 of a resistor 84 and a capacitor 86 that are connected in series between the output of the power supply 72 and ground. This permits the power supply 72 to be marginally filtered and therefore less expensive.

A resistor 88 is connected between the junction 82 and the output 66 of the NAND gate 10 in order to balance the current that the IC 2 draws when it is sourcing current to the transistor 74 compared to when it is not sourcing that current and thus prevent the control signal of FIG. 1C from appearing as a ripple at the junction 82. The resistance of the resistor 88 is preferably the same as the resistance of the resistor 80.

If the balancing resistor 88 is not used, additional current is drawn through the resistor 84 when the output 66 is high because of the base current supplied to the transistor 74. This causes a slight reduction in the supply voltage at the junction 82 for the IC's 2 and 4. This additional current is not drawn when the output 66 is low so that the voltage at the junction 82 is not reduced. A ripple voltage thus appears at the junction 82 that can cause the oscillators 14 and 38 to lock to the same frequency and cause the light 68 to blink rather than flicker.

The operation of the circuit just described for simulating a candle is now described with reference to the waves of FIGS. 1A, 1B and 1C. The output of the NAND gate 34 becomes a low when the respective outputs 18, FIG. 1A, and 42, FIG. 1B, of the multivibrators are both a high and is inverted by the NAND gate 10 so as to produce the wave of FIG. 1C, which is the control signal. The relative frequencies of the multivibrators can be changed by altering the value of a circuit component of one of them. In the example shown, the resistor 20 is variable so that the frequency of the first multivibrator 14 can be changed. If the frequency of this multivibrator is made greater than the frequency of the multivibrator 38, waves such as indicated in FIGS. 1A and 1B appear at the outputs 18 and 42 respectively.

When the waves of FIGS. 1A and 1B are both positive, the control signal of FIG. 1C is positive so as to cause the transistor 74 to conduct, thereby increasing the brightness of the light emitted from the bulb 68 due to the shorting of the resistor 76. This increase in brightness is referred to as positive flicker. During the low levels of the control signal of FIG. 1C, the transistor 74 does not conduct so that the brightness of the light 68 is at its lower level. Note that the waves of FIGS. 1A and 1B start out in what appears to be an in phase condition. Actually, however, the frequencies are slightly different so that saying that the waves are in phase is technically inaccurate. Nonetheless, it is true, that both waves are high during the entire high pulse output 90 of the higher frequency multivibrator 14 shown in FIG. 1A so as to produce a pulse 92 in FIG. 1C having a maximum duration. As time goes on, the durations of successive pulses in FIG. 1C become less until a point 94 is reached where there is no positive pulse and consequently no change in the brightness of the bulb 68 when one would be expected. That no positive pulse is produced is explained by noting that the longer negative pulse $\mathbf{94}^{1}$ FIG. 1B straddles the positive pulse $\mathbf{94}^{11}$ of FIG. 1A. Furthermore, if the frequencies of the oscillators 14 and 38 are close enough together, for example, 5 Hz and 5.066 Hz respectively, the pulses for about one second on both sides of a point such as 94 are of such short duration as to increase the energy supplied to the filament 70 so slightly that there is very little if any noticeable change in the brightness of the light it emits, thereby ensuring that the absence of flicker is clearly noticeable. The frequencies represented by FIGS. 1A and 1B are much farther apart than 0.066 cycles a second so that only a few pulses such as 95 and 97 have the short duration referred to. An absence of noticeable flicker is important to the simulation.

The time between maximum and zero pulse duration, or between maximum and minimum positive flickers, depends on the difference between the frequencies of the multivibrators 14 and 38 and should be between seven and thirty seconds, preferably fifteen seconds. With the frequencies mentioned above, the time between a maximum brightness such as would occur during the pulse 90 and minimum brightness as would occur at the point 94 is 15 seconds. The frequency of the flicker is five cycles a second so as to be within the desired range of 4.5 to 6.0 Hz.

Note that the intervals between flickers are, for the most part, greater than the flicker durations themselves and that the intervals between flickers gradually increase and decrease so as to imitate a candle flame. Although not preferred, the polarity of the control wave of FIG. 1C could be inverted by eliminating the NAND gate 10 and using the wave at the output 60 of the NAND gate 34 as the control signal. This would cause the maximum brightness to occur during longer periods of time that are separated by shorter intervals during which the brightness is reduced to a lower level. This is referred to as a negative flicker, but the positive flicker previously described is preferred.

In order to permit the output of the multivibrator 14 to be shown on an oscilloscope without affecting its operation, the inputs 96, 98 of the NAND gate 12 are connected to the output 18 of the first multivibrator 14, and in order to permit the output of the multivibrator 38 to be shown, the inputs 100, 102 of the NAND gate 36 are connected to the output 42 of the second multivibrator 38. When an oscilloscope or other instrument is coupled to an output 104 of the NAND gate 12 or to the output 106 of the NAND gate 36, it is decoupled from the respective multivibrator so as not to affect its operation.

Figure 2:
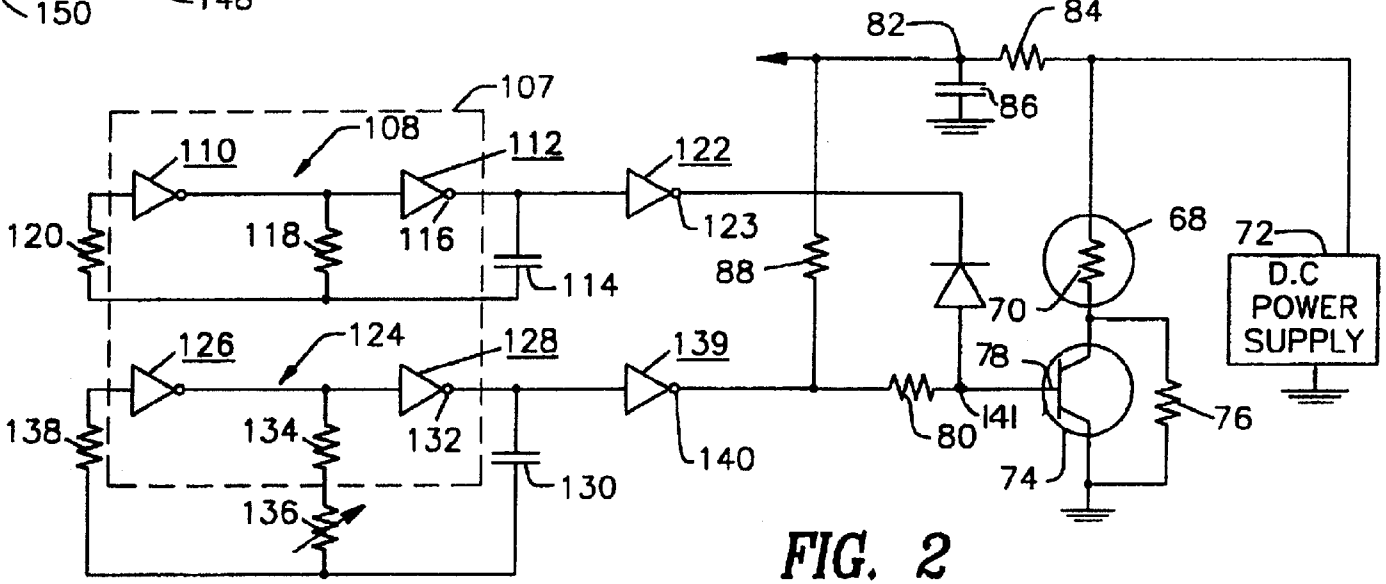
FIG. 2 is a schematic diagram of another circuit for deriving a control signal of this invention.

Reference is now made to FIG. 2 that illustrates a less expensive circuit for generating a control signal like that of FIG. 1C in which the multivibrators are on the same chip 107, e.g., a CD4069. This operates as desired unless the oscillators become locked through stray coupling within the CD4069 IC. A first multivibrator 108 that produces an output like FIG. 1A is shown as being comprised of inverters 110 and 112 that are connected in series. One side of a capacitor 114 is connected to the output 116 of the inverter 112, and the other side is respectively connected to the inputs of the inverters 110 and 112 via resistors 118 and 120. The output 116 of the inverter 112 is connected to the input of an inverting buffer 122 so as to produce a signal like that of FIG. 1A at its output 123. A second multivibrator 124 that produces an output like FIG. 1B is comprised of inverters 126 and 128 that are connected in series. One side of a capacitor 130 is connected to the output 132 of the inverter 128, and its other side is connected via a resistor 134 and a variable resistor 136 to the input of the inverter 128 and via a resistor 138 to the input of the inverter 126. The output 132 of the inverter 128 is connected to the input of an inverting buffer 139 so as to produce a signal like FIG. 1B at its output 140. The frequency of the wave of FIG. 1B can be varied by adjusting the value of the resistor 136.

The means for controlling the brightness of a light and the power supply for the light and for the circuits are the same as in FIG. 1, and the components thereof are designated in the same manner. The control signal of FIG. 1C is made to appear at the base electrode 78 of transistor 74 as follows. The output 123 of the buffer inverter 122, where the wave of FIG. 1A appears, is coupled in series with a diode 142 to the base electrode 78 of the transistor 74. The output 140 of buffer inverter 139, where the wave of FIG. 1B appears, is coupled via the current limiting resistor 80 to the base electrode 78. The diode 142, the resistor 80 and the base 78 meet at a junction 141.

The operation of FIG. 2 is as follows. The buffer inverters 122 and 139, the resistor 80 and the diode 142 form a discrete component AND gate supplying voltage to the base 78 of transistor 74. When the output 140 of buffer inverter 139 and the output 123 of buffer inverter 122 are high, the base 78 of transistor 74 will be high and the transistor 74 will conduct. If the output of buffer inverter 139 or the output of the buffer inverter 122 is low, the base 78 of the transistor 74 will be low and the transistor will not conduct. The wave that appears at the base electrode 78 of transistor 74 is shown in FIG. 1C. The balancing resistor 88 can be connected on either side of the current limiting resistor 80.

It is contemplated that the D.C. power supply 72 in FIGS. 1 and 2 could be a battery in which case the filter comprised of the resister 84 and the capacitor 86 as well as the balancing resistor 88 could be eliminated.

Figure 3:
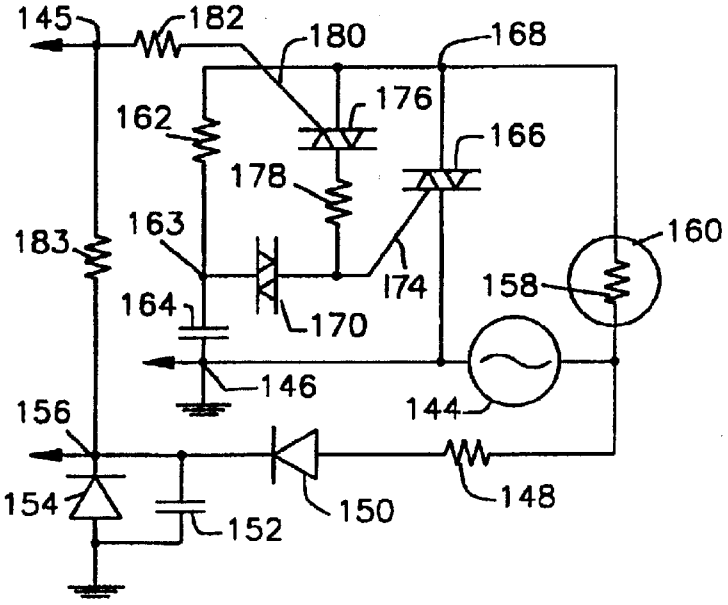
FIG. 3 is a circuit for energizing a bulb with A.C. in response to a control signal of this invention.

Reference is now made to FIG. 3 for a description of a circuit for energizing the "candle" of this invention with A.C. power in response to a control signal like that shown in FIG. 1C. All of the light control circuitry coupled to respond to the control signal at a junction 143 of FIG. 1 or the junction 141 of FIG. 2 is eliminated, and the following circuitry is substituted for it.

D.C. operating voltage for the chips 2 and 4 of FIG. 1 or for the chip 107 of FIG. 2 is derived by coupling a source 144 of A.C. voltage between a grounded terminal 146 and a rectifying circuit comprised of a resistor 148, a diode 150, a capacitor 152 and a zenor diode 154 connected as shown. The D.C. operating voltage for the chips 2 and 4, or 107, is at the junction 156 of the diode 150 and the zenor diode 154.

Energization of a filament 158 of a lamp 160 in response to the control signal like that of FIG. 1C that is at the junction 143 of FIG. 1 or at the junction 141 of FIG. 2 so as to produce a candle-like flicker in accordance with this invention is attained as follows. The filament 158 is connected in series with a resistor 162 and a capacitor 164 between the ungrounded side of the A.C. source 144 and the grounded terminal 146 so as to meet at a junction 163. A triac 166 is connected between a junction 168 of the filament 158 and the resistor 162 and the grounded terminal 146, and a bilateral trigger diac 170 is connected between the junction 163 of the resistor 162 and the capacitor 164 and the gate electrode 174 of the triac 166.

The circuit thus far described in the paragraph immediately above operates as a conventional incandescent light dimmer in which the resistor 162 and capacitor 164 are a single-element phase-shift network. When the voltage across capacitor 164 reaches the breakover voltage of diac 170, the capacitor 164 is partially discharged by the diac 170 into the gate 174 of the triac 166. The triac 166 is then triggered into the conduction mode for the remainder of that half-cycle. Selection of the resistance value of resistor 162 adjusts the amount of phase shift at gate 174 and determines the point in the A.C. half-cycle at which the triac 166 triggers into the conduction mode. The point in the half cycle at which triac 166 starts to conduct determines the RMS voltage across filament 158 that determines the minimum brightness of lamp 160.

In accordance with this invention, a triac 176 is connected between the junction 168 and the control electrode 174 of the triac 166 via a current limiting resistor 178. The control electrode 180 of the triac 176 is connected to a terminal 145 via a current limiting resistor 182. The terminal 145 would be connected so as to receive the control signal at the junction 143 of FIG. 1 or the junction 141 of FIG. 2. A current balancing resistor 183 for preventing a ripple from appearing at the voltage supply terminal 156 is connected between the terminals 145 and 156. While the control signal, FIG. 1c, is high, the triac 176 conducts so as to make the control electrode 174 of the triac 166 high, thereby causing current to flow through the filament 158 during entire alternate half cycles of the voltage from the source 144. The effect of the phase shift network comprised of the resistor 162 and the capacitor 164 is therefore eliminated, and a positive flicker is produced whenever the control signal of FIG. 1C is high.

Square waves such as shown in FIGS. 1A, and 1B could be derived in other ways such as by clipping the output of a sine wave oscillator. Alternatively, the outputs of sine wave oscillators could be applied to the inputs of a NAND gate or an AND gate.

Figure 4B:
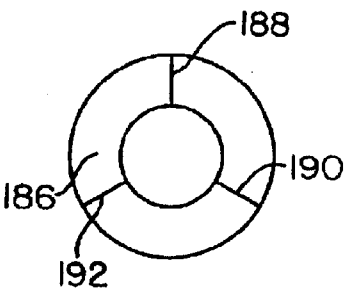
FIGS. 4A and 4B illustrate an incandescent bulb constructed so as to aid in simulating a candle.
Figure 4A:
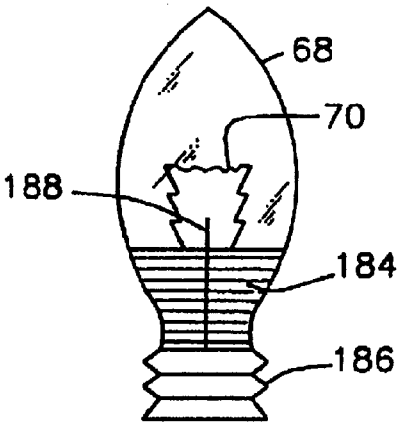

Reference is made to FIGS. 4A and 4B for a description of physical features of the bulb 68 which, in accordance with an aspect of the invention, contributes to the simulation of a candle flame. The bulb 68 is preferably formed from frosted glass or may be a clear bulb with a frosted plastic cover, not shown. The lower portion 184 of the bulb 68 is dark, preferably blue, and the bulb 68 can be screwed into a socket as indicated at 186. Dark lines 188, 190 and 192 extend part way up from the dark area 184 so as to simulate a wick. As best seen in the bottom view shown in FIG. 4B, the lines 188, 190 and 192 are preferably at 120° intervals. Because of the frosting, the filament 70 of the bulb would not be seen so that it is shown in broken lines.

Figure 5:
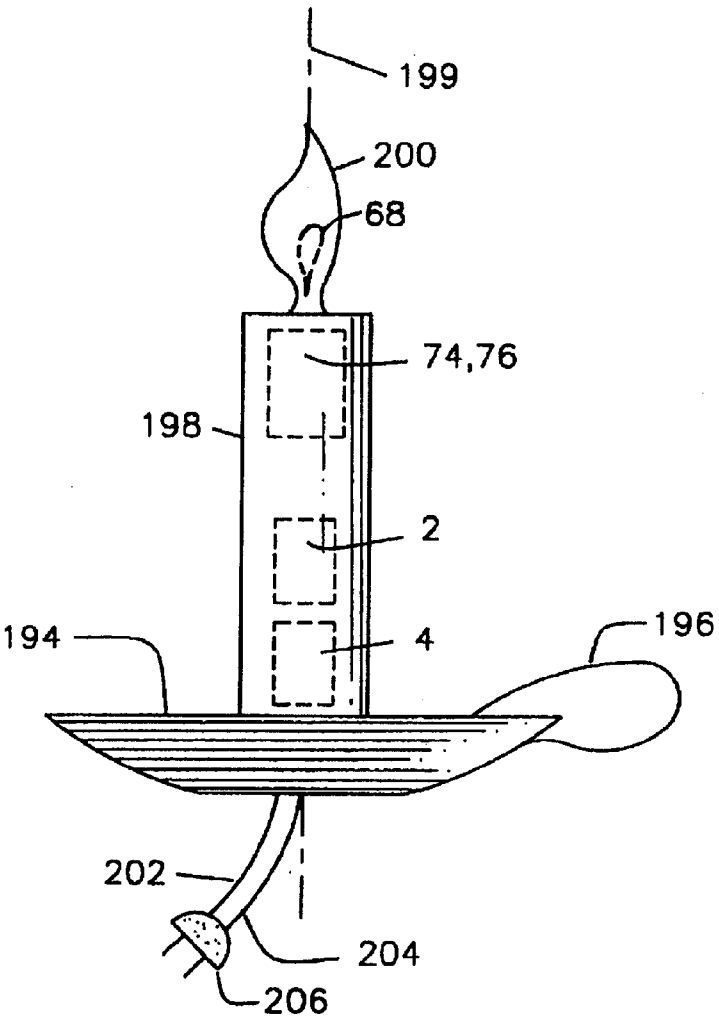
FIG. 5 shows a candle incorporating the invention.

FIG. 5 illustrates a candle constructed in accordance with this invention. A base 194 having a handle 196 supports a cylinder 198 containing, as indicated by dashed lines, the chips 2 and 4 and the associated circuitry of FIG. 1 as well as the transistor resistor combination 74, 76. If the circuit of FIG. 2 is used, its chip 107 would be contained in the cylinder 198 in place of the chips 2 and 4. The bulb 68 that is mounted at the top of the cylinder 198 is made of clear glass in this example and is shown by a broken line because it is within a translucent plastic cover 200 that is shaped like a candle flame. Making the cover 200 asymmetrical about the axis 199 of the cylinder 198 so as to appear to be twisted enhances the simulation of a flickering flame. Leads 202 and 204 are connected to a plug 206 that can be inserted in a power outlet so as to provide A.C. for the power supply 72 of FIGS. 1 and 2 or to be the supply 144 of FIG. 3. If a battery is used, it is contained within the cylinder 198, and the leads 202, 204 and the plug 206 are not required.

Although other values of components may be used, the following have been found to work well.

| | | |
|---|---|---|
| FIG. 1 | Chips | 4011 |
| | R20 | 200K |
| | R22 | 820K |
| | R25, R46 | 150K |
| | R44 | 1 MEG |
| | C16, C40 | 0.1 uf |
| | R76 | 22 |
| | R80 | 10K |
| | R84 | 4.7K |
| | R88 | 10K |
| FIG. 2 | Chip 107 | CD4069 |
| | R118 | 750K |
| | R120, R138 | 2M |
| | R134 | 720K |
| | R136 | 50K |
| | C108, C122 | 0.1 uf |
| FIG. 3 | R148 | 6.8K 1W |
| | R162 | 1 MEG |
| | R178 | 1K |
| | R182 | 1K |
| | R183 | 1K |
| | C152 | 223 uf |
| | C164 | 0.1 uf |
| | DIAC 170 | HT35 |
| | TRIAC 166 | Q401E3 |
| | TRIAC 176 | L401E3 |

I claim:

1. [Apparatus] *An apparatus* for simulating a candle comprising:

*a* power supply;

[means for forming a control signal by combining first and second waveforms, whereby said control signal is provided at times that the first and second waveforms have the same polarity;]

light emitting means coupled in series with said power supply;

control means for varying the brightness of light emitted by said light emitting means [in response to said control signal];

means for generating a control signal;

means for coupling said control signal to said control means; and said control signal being such that it changes the brightness of the light *within a visible range so as to produce flickers* during successive *spaced* periods that gradually increase to a maximum duration and then gradually decrease to a minimum duration, the minimum duration being such as to make no apparent change in brightness.

2. A method for simulating a flickering candle with a bulb having a filament comprising *the steps of*:

[forming a control signal by combining first and second waveforms, whereby said control signal is provided at times that the first and second waveforms have the same polarity;]

causing current to flow through the filament [in response to said control signal] *so that it emits visible light*;

changing the current flowing in the filament *so as to change the brightness of the light it emits within a visible range* during successive spaced periods that gradually increase in duration;

changing the current flowing in the filament during following successive spaced periods that gradually decrease in duration; and the duration of said following successive *spaced* periods decreasing to a value such that they cause no noticeable change in brightness of light emitted by the filament.

3. [Apparatus as set forth] *The apparatus as claimed* as set forth in claim 1 wherein said periods occur at a given frequency.

4. [Apparatus as set forth] *The apparatus as claimed* in claim 3 wherein said given frequency is between 4.5 and 6 times a second inclusive.

5. [Apparatus as set forth] *The apparatus as claimed* in claim 1 wherein the control signal is such that the time between maximum and minimum durations of said periods lies between seven and thirty seconds inclusive.

6. [Apparatus as set forth] *The apparatus as claimed* in claim 1 wherein said light emitting means has a filament in an upper portion, a dark lower portion, and at least one dark line extending from said lower portion toward said filament so as to appear as a wick.

7. [Apparatus as set forth] *The apparatus as claimed* in claim 1 wherein:

said power supply provides a D.C. voltage; and said control means is comprised of a resistor connected in series with said light emitting means and a transistor in shunt with said resistor.

8. [Apparatus] *An apparatus* for generating a control signal for means in circuit with a light emitting means and a power supply so as to control the amount of light emitted by said light emitting means in such manner so to simulate a candle comprising:

a first oscillator for producing an output having a first frequency;

a second oscillator for producing an output having a second frequency that has a predetermined nominal difference with respect to said first frequency and that is other than an harmonic or subharmonic relationship to said first frequency; and means for producing said control signal only during times when the outputs of both of said first and second oscillators have the same polarity.

9. [Apparatus as set forth] *The apparatus as claimed* in claim 8 wherein said first and second oscillators are multivibrators.

10. [Apparatus] *An apparatus* for controlling current through a light emitting means so as to simulate a candle comprising:

a D.C. power supply;

a resistor and a filament connected in series with said power supply;

a transistor coupled in shunt with said resistor;

a first oscillator producing a first waveform of a first frequency;

a second oscillator producing a second waveform of a second frequency that is different from said first frequency and is other than harmonically related thereto;

means for combining said first and second waveforms together so as to produce a control signal only when both of said first and second waveforms have the same polarity; and means for coupling the control signal to said transistor so as to cause it to conduct only when said control signal is present.

11. [Apparatus as set forth] *The apparatus as claimed* in claim 10 wherein:

said first and second oscillators and said means for producing a control signal are connected so as to receive voltage from said D.C. power supply;

said means for coupling the control signal to the transistor includes a resistor; and a resistor connected between said power supply and said means for coupling [a] *the* control signal to said transistor[—] whereby the voltage said first and second [oscillator receives] *oscillators receive* from said D.C. power supply is not altered when said control signal causes said transistor to conduct.

12. [Apparatus as set forth] *The apparatus as claimed* in claim 10 wherein said first and second oscillators are multivibrators.

13. [Apparatus as set forth] *The apparatus as claimed* in claim 10 wherein the first and second frequencies are between 2 and 10 Hz.

14. [Apparatus] *An apparatus* for simulating the flame of a candle comprising:

a first triac having a control electrode and first and second output electrodes;

an A.C. power supply and a light emitting means connected in series between said first and second output electrodes;

a resistor and a capacitor connected in series in the order named between said first and second output electrodes, said resistor and said capacitor meeting at a junction;

a trigger diac connected between said junction and said control electrode of said first triac;

a second triac having a control electrode, a first output electrode connected to said first output electrode of said first triac and a second output electrode connected to said control electrode of said first triac;

means for generating a control signal;

means for coupling said control signal to said control electrode of said second triac;

said control signal being such that it changes the brightness of the light emitting means during successive periods that gradually increase to a maximum duration and then gradually [decreases] *decrease* to a minimum duration, the minimum duration being such as to produce no apparent change in brightness.

15. A method for simulating a flickering candle flame comprising the steps of:

forming a control signal by combining first and second waveforms, whereby said control signal is provided at times that said first and second waveforms have the same polarity;

causing a light emitting means to emit light of a given brightness in response to said control signal;

changing the brightness of the emitted light *within a visible range in response to the control signal* in a given direction during successive spaced periods that gradually increase in duration;

changing the brightness of the emitted light *within a visible range in response to the control signal* in the said given direction during following successive *spaced* periods that gradually decrease in duration; and decreasing the duration of said following successive periods to a value such as to produce no noticeable change in the brightness of the emitted light.

*16. An apparatus for simulating a candle comprising:*

*a power supply;* light emitting means coupled in series with said power supply;

*control means for varying the brightness of light emitted by said light emitting means in response to a control signal;*

*means for generating a control signal such that it causes variations in the brightness of the light emitted by said light emitting means within a visible range when applied to said control means, said control signal having spaced pulses that gradually increase in duration to a maximum value and then gradually decrease in duration to a minimum value, said spaced pulses occurring between 4.5 and 6.0 times a second inclusive and the time between a pulse of maximum duration and a pulse of minimum duration being between 7 and 30 seconds inclusive; and*

*means for coupling said control signal to said control means whereby the brightness of the light changes during successive periods that gradually increase to a maximum duration and then decrease to a minimum duration, the minimum duration being such as to make no apparent change in brightness.*

*17. A method for simulating a flickering candle with a bulb having a filament comprising the steps of:*

*causing current to flow through the filament so that it emits visible light;*

*changing the current flowing in the filament so as to change the brightness of the visible light it emits during successive spaced periods occurring between 4.5 and 6.0 times a second inclusive that gradually increase in duration to a maximum value;*

*changing the current flowing in the filament so as to change the brightness of the visible light it emits during following successive spaced periods occurring between 4.5 and 6.0 times a second inclusive that gradually decrease in duration to a minimum value;*

*the duration of said following successive spaced periods decreasing to a value such that they cause no noticeable change in brightness of light emitted by the filament; and*

*the time between a period of maximum duration and a period of minimum duration being between 7 and 30 seconds inclusive.*

*18. A method for simulating a flickering candle with an electrical light emitting means comprising the steps of:*

*causing the light emitting means to emit visible light of a given brightness;*

*changing the brightness of the light emitted by said light emitting means so as to produce spaced flickers within a visible range that gradually decrease in duration;*

*subsequently changing the brightness of the light emitted by said light emitting means so as to produce spaced flickers within a visible range that gradually increase in duration; and*

*causing the light being emitted by said light emitting means to produce an absence of noticeable flickers between the flickers that decrease in duration and the flickers that increase in duration.*

*19. A method for simulating a flickering candle with an electrical light emitting means comprising the steps of:*

*causing the light emitting means to emit light of a given brightness;*

*causing spaced changes in the brightness to produce flickers within a visible range in the light emitted by said light emitting means, the changes having durations that gradually decrease;*

*causing spaced changes in the brightness to produce flickers within a visible range in the light emitted by said light emitting means, the changes having durations that gradually increase; and*

*causing the light being emitted by said light emitting means to produce an absence of flickering between the changes in brightness having durations that gradually decrease and the changes in brightness having durations that gradually increase.*

* * * * *